(12) United States Patent
Rescate

(10) Patent No.: US 11,252,933 B2
(45) Date of Patent: Feb. 22, 2022

(54) PET TRAINING DEVICE

(71) Applicant: Rebecca Rescate, Bristol, PA (US)

(72) Inventor: Rebecca Rescate, Bristol, PA (US)

( * ) Notice: Subject to any disclaimer, the term of this patent is extended or adjusted under 35 U.S.C. 154(b) by 247 days.

(21) Appl. No.: 16/709,774

(22) Filed: Dec. 10, 2019

(65) Prior Publication Data

US 2020/0178492 A1 Jun. 11, 2020

Related U.S. Application Data

(60) Provisional application No. 62/777,758, filed on Dec. 10, 2018.

(51) Int. Cl.
*A01K 1/01* (2006.01)
*A01K 15/02* (2006.01)

(52) U.S. Cl.
CPC .......... *A01K 1/0121* (2013.01); *A01K 1/0125* (2013.01); *A01K 15/02* (2013.01)

(58) Field of Classification Search
CPC ..... A01K 1/0121; A01K 1/0125; A01K 15/02
USPC .................................................. 119/162, 161
See application file for complete search history.

(56) References Cited

U.S. PATENT DOCUMENTS

| | | |
|---|---|---|
| 2,676,331 A | 4/1954 | Inman |
| 3,688,742 A | 9/1972 | McGee |
| 3,757,738 A | 9/1973 | Hall |
| 4,181,988 A | 1/1980 | Skaggs |
| 5,103,772 A | 4/1992 | Schmid |
| 5,787,514 A | 8/1998 | Erli |
| 6,014,946 A | 1/2000 | Rymer |
| 6,701,539 B1 * | 3/2004 | Hogan ................... A47K 13/06 119/162 |
| 8,051,804 B1 | 11/2011 | Rescate |
| 8,671,888 B1 * | 3/2014 | Lei ........................ A01K 1/0114 119/162 |
| 2008/0202439 A1 | 8/2008 | Lapidge et al. |
| 2009/0211530 A1 * | 8/2009 | Yu ......................... A01K 1/0121 119/162 |
| 2020/0178492 A1 * | 6/2020 | Rescate ................ A01K 1/0125 |

* cited by examiner

*Primary Examiner* — Yvonne R Abbott-Lewis
(74) *Attorney, Agent, or Firm* — LaMorte & Associates P.C.

(57) ABSTRACT

An assembly and method for conditioning a pet to utilize a toilet when making waste. A primary tray is provided. The primary tray has a first depression, wherein a primary opening is formed in the depression. A plurality of inserts are provided. The inserts progress in size. Each of the inserts defines a central opening that is proportional to the size of the insert. The primary tray is placed on the toilet. The primary opening within the primary tray is covered by the inserts. Litter is added into the depression of the primary tray to entice the pet to utilize the primary tray as a litter box. Over a period of time, the pet will become accustomed to jumping onto the primary tray to make waste. The inserts are removed one at a time. This slowly uncovers the primary opening over a period of time as a pet is conditioned.

20 Claims, 6 Drawing Sheets

PET TRAINING DEVICE

RELATED APPLICATIONS

This application claims the benefit of U.S. Provisional Patent Application No. 62/777,758, filed Dec. 10, 2018.

BACKGROUND OF THE INVENTION

1. Field of the Invention

In general, the present invention relates to devices and methods that are used to train a pet to utilize a flush toilet. More particularly, the present invention relates to devices and methods that suspend litter over the seat of a toilet to condition a pet to make waste into the toilet seat opening.

2. Prior Art Description

Many pets, especially cats, can be trained to use a litter box. However, litter boxes must be cleaned and the litter periodically changed. Litter can be accidentally moved out of litter box by a pet and litter boxes can emit unappealing smells. It is for these reasons that many pet owners prefer options other than litter boxes.

The most obvious choice, other than a litter box, is to train a pet to relieve itself outside. However, for many people, such a choice is not possible. Many people do not have the time in their schedules to walk their pets at necessary times. Furthermore, many pets cannot be trained to safely roam free outdoors.

If a pet owner does not want the hassle of a litter box and cannot train a pet to go outside, the only other viable option is to train the pet to use the toilet. The way a pet is trained to use a toilet is to position the litter atop the toilet. Eventually, a pet will get into the habit of going to relieve itself atop the toilet. Over time, the amount of litter positioned atop the toilet is decreased, until little or no litter is needed to entice the pet. The pet is then trained to use the toilet and the pet's waste can be flushed away.

In the prior art, there are many litter trays that are designed to hold litter over the opening of a toilet. Such prior art devices are exemplified by U.S. Pat. No. 3,688,742 to McGee, entitled Toilet Training Assembly for Cats. Many of the prior art litter trays have openings that lead to the underlying toilet. The size of the openings, in such prior art, can often be enlarged by removing material from the suspended litter tray. However, it has been found that pets, especially certain cats, are tentative about perching themselves atop a toilet bowl. Often, a cat may be comfortable using a litter tray provided the hole to the underlying toilet is small. As soon as a pet owner enlarges the hole, the cat may refuse to use the litter tray and the training cycle is lost. The hole cannot be reduced in size because the hole was enlarged by removing material from the litter tray. The only way a pet owner can return to the previous configuration is to purchase a new litter tray and again begin the training process.

In U.S. Pat. No. 8,051,804 to Rescate, an improved training device is disclosed that uses a primary litter tray and secondary litter trays. The primary litter tray is placed atop the toilet. The secondary litter trays are used to control the size of the opening. In this manner, the opening can be made larger or smaller by simply changing the secondary tray. Although an improvement, this system also has some problems. The size differential between the various trays is relatively large. This makes it difficult for a pet to adapt to changes when a tray is removed. Also, the trays are shallow. This prevents the trays from holding larger volumes of litter and causes litter to be lost into the toilet when the trays are manipulated. Lastly, the trays are interconnected and must be cut apart when removed. This prevents a tray from being replaced, should the change of the tray be too large for a pet to adapt.

A need therefore exists for a pet training device that can train a pet to use a toilet, where the size of the opening exposed to the toilet can be decreased as well as increased using trays of different sizes, wherein the trays are separate and distinct. A need also exists for a training system with more trays and less size differential between the trays. Lastly, a need exists for a training system with deeper trays that can hold more litter. These needs are met by the present invention as described and claimed below.

SUMMARY OF THE INVENTION

The present invention is an assembly and method for conditioning a pet to utilize a toilet when making waste. A primary tray is provided. The primary tray has a first depression, wherein a primary opening is formed in the depression. A plurality of stackable inserts are provided. The stackable inserts progress in size between a largest insert and a smallest insert. Each of the stackable inserts defines a central opening that is proportional to the size of the insert.

The primary tray with stacked inserts is placed on the toilet. The primary opening within the primary tray is covered by the stackable inserts. Litter is added to entice the pet to utilize the primary tray as a litter box. Over a period of time, the pet will become accustomed to jumping onto the primary tray and stacked inserts to make waste. The stacked inserts are removed one at a time with a relatively long periodicity between removals. This slowly uncovers the primary opening over a period of time. Eventually all the stackable inserts are removed and the pet is conditioned to jump onto the primary tray to make waste. The primary tray can then be removed, wherein the pet makes waste directly into the toilet.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE DRAWINGS

Although the present invention training system can be embodied in many ways, the embodiment illustrated shows the training system configured to set upon a standard round toilet seat commonly used in the United States. This embodiment is selected in order to set forth one of the best modes contemplated for the invention. The illustrated embodiment, however, is merely exemplary and it should be understood that the present invention can be used with any type of toilet, bucket, or similarly shaped receptacle for pet waste.

Figure 1:
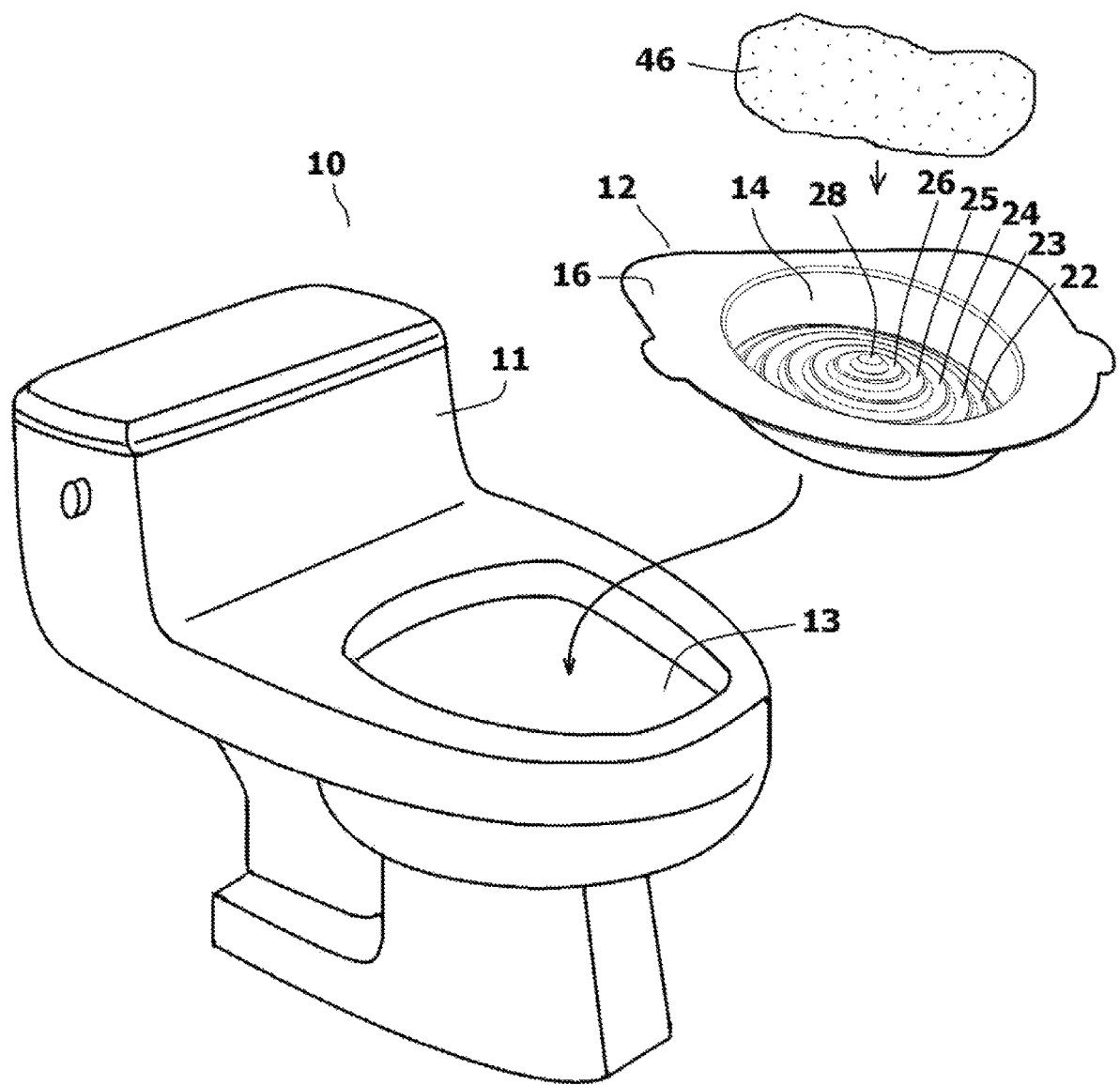
FIG. 1 is a front assembled view of an exemplary embodiment of a pet training system for a toilet.
Figure 2:
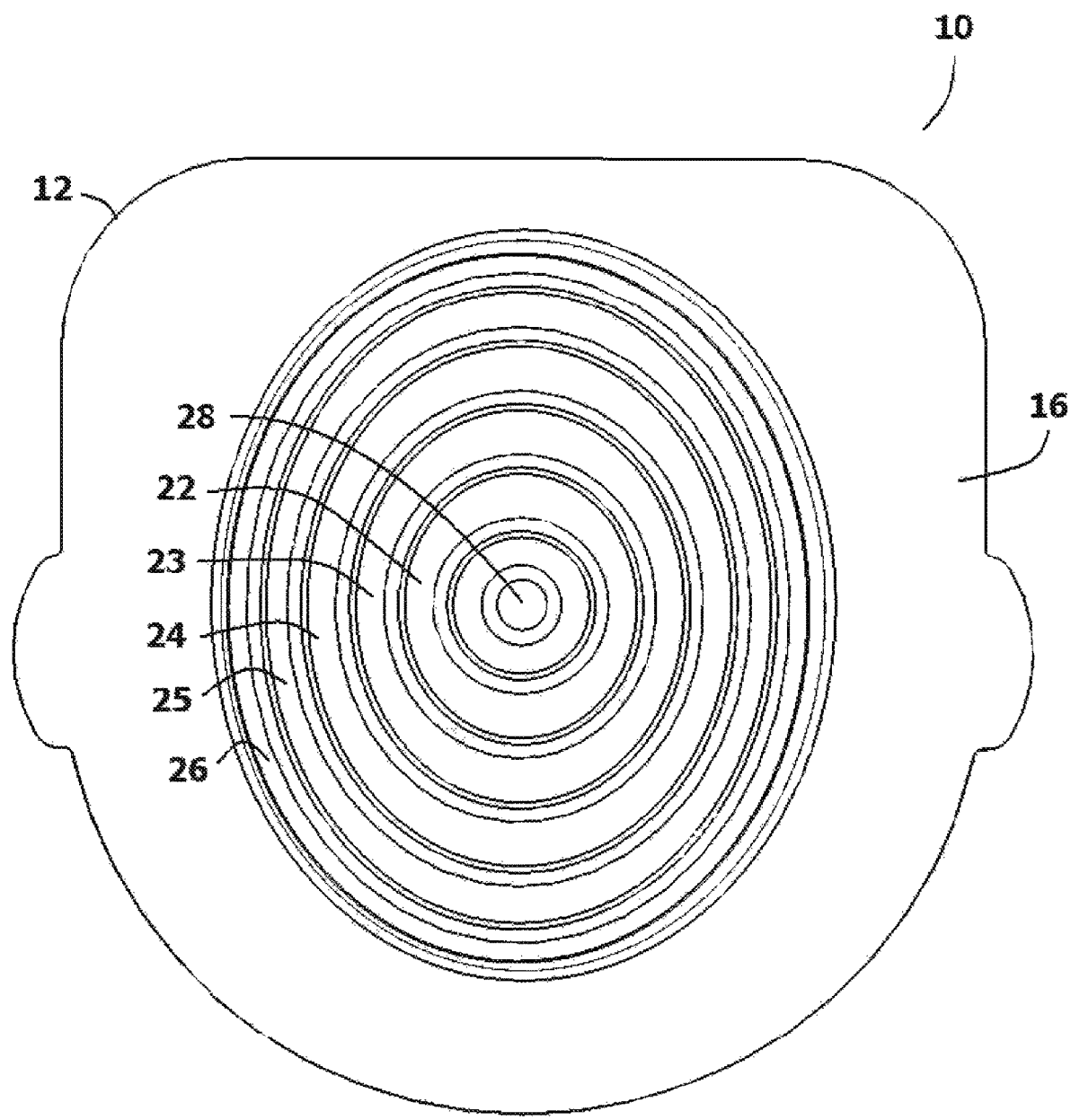
FIG. 2 is a top perspective view of the assembled exemplary embodiment.
Figure 3:
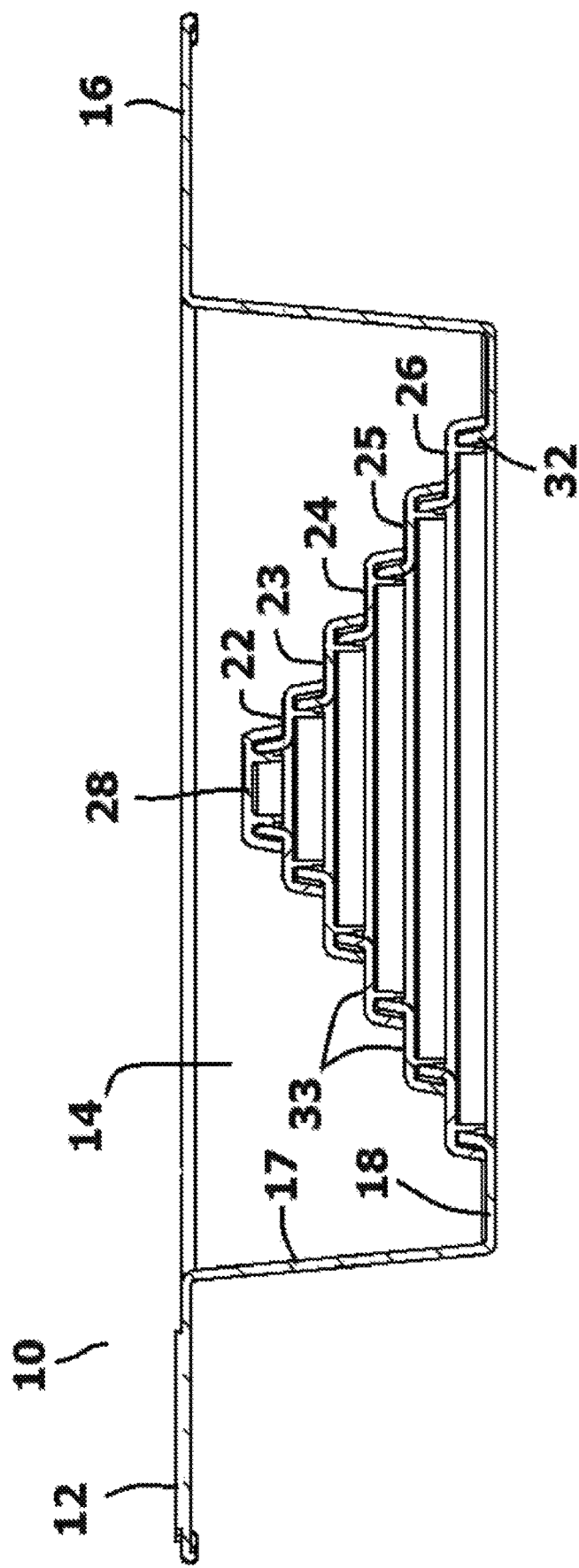
FIG. 3 is a cross-sectional view of the assembled exemplary embodiment.
Figure 4:
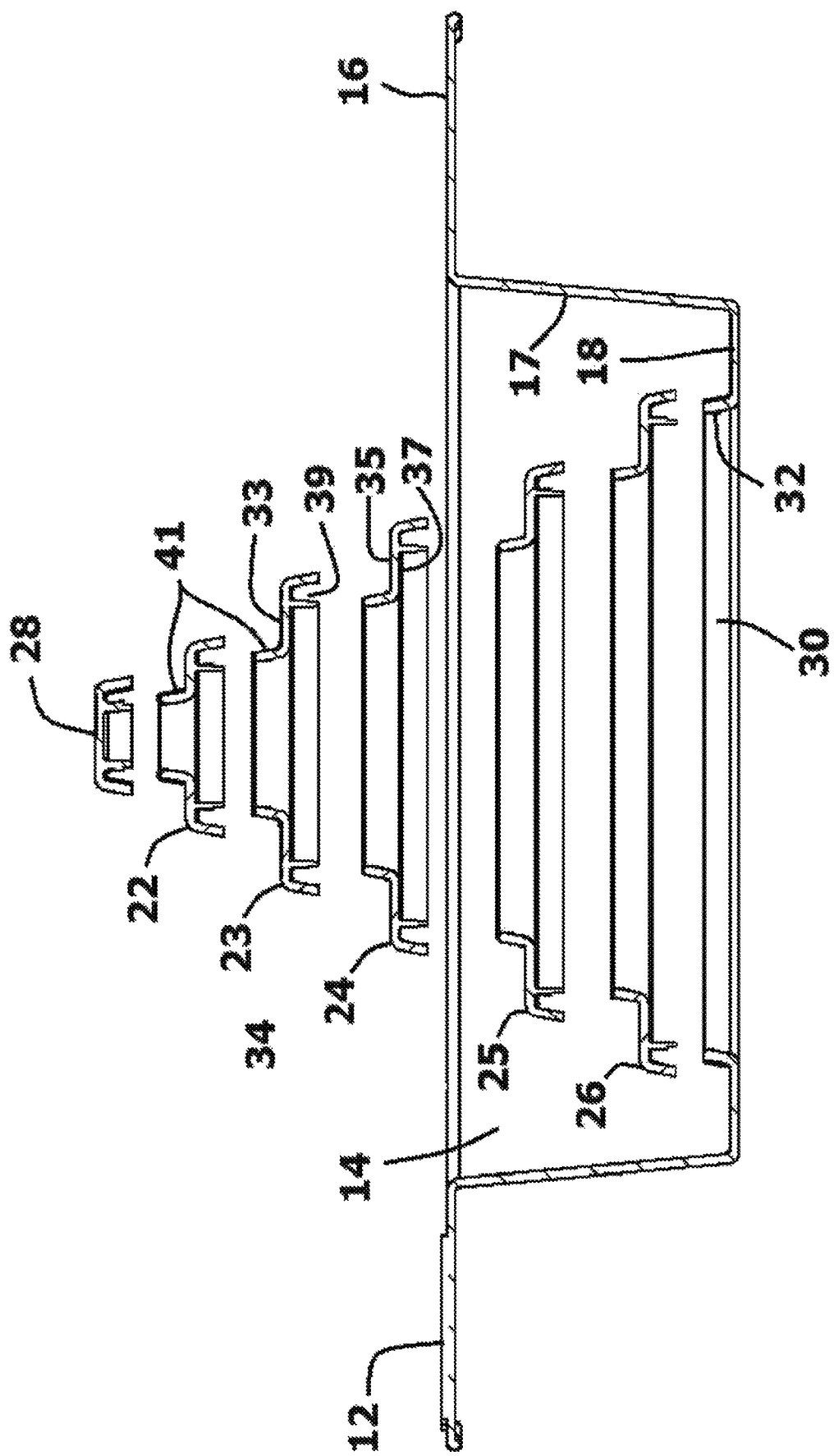
FIG. 4 is a cross-sectional exploded view of the exemplary embodiment.

Referring to FIG. 1, in conjunction with FIG. 2, FIG. 3 and FIG. 4, the exemplary embodiment of the training system 10 is shown. The training system 10 is shown being used in conjunction with a standard toilet 11. However, the training system 10 can be used on elongated toilets, a bucket or any similar structure. The training system 10 includes a primary tray 12 and a series of stackable inserts 22, 23, 24, 25, 26. The primary tray 12 has an outer flange 16 that is sized and shaped to rest upon the bowl 13 of the toilet 11. A depression 14 is formed in the primary tray 12 in the section of the primary tray 12 that is positioned above the center of the bowl 13. The depression 14 has bottom surface 18. The depression 14 is defined by a continuous vertical wall 17 that descends from the plane of the outer flange 16 to the bottom surface 18. The depression 14 preferably has a depth of between one and four inches. The circumference of the depression 14 is sized to be no larger than the opening for the bowl 13 of the toilet 11. In this manner, the depression 14 can pass into the bowl 13.

A primary opening 30 is formed in the bottom surface 18 of the depression 14. The primary opening 30 has a raised peripheral wall 32 of a height H1. The primary opening 30 can be reduced in size by placing one or more of the inserts 22, 23, 24, 25, 26 over the primary opening 30. If all of the inserts 22, 23, 24, 25, 26 are in place, only a small opening is left. This last opening can be closed by a cap 28, wherein the primary opening 30 becomes fully obstructed.

Each of the inserts 22, 23, 24, 25, 26 is generally annular in shape and defines its own central opening 34. When the inserts 22, 23, 24, 25, 26 are stacked, the smaller inserts 22, 23, 24, 25 fill the central openings 34 of the larger inserts 23, 24, 25, 26, respectively. It will therefore be understood that the size of the opening presented by the training system 10 can be made smaller by adding inserts 22, 23, 24, 25, 26 or can be made larger by removing inserts 22, 23, 24, 25, 26.

Each of the inserts 22, 23, 24, 25, 26 is annular and contains a ring 33 that is either circular or elliptical in shape. Each ring 33 has a top surface 35 and a bottom surface 37. A groove 39 is formed along the bottom surface 37 of the ring 33. The groove 39 has a generally inverted U-shaped cross-sectional profile that progresses along a looped pathway that is either circular or elliptical. Additionally, each insert 22, 23, 24, 25, 26 has a raised inner wall 41 that extends upwardly from the ring 33 and surrounds its central opening 34. As such, each of the inserts 22, 23, 24, 25, 26 has a ring 33 with a U-shaped groove 39 on the bottom surface 37 of the ring 33 and a raised inner wall 41 on the top surface 35 of the ring 33. The raised inner wall 41 of each insert 22, 23, 24, 25, 26 has a wall height that corresponds to the depth of the groove 39 on that same insert 22, 23, 24, 25, 26.

Furthermore, the looped pathway of each groove 39 on any one insert 22, 23, 24, 25, is equal in position to the looped pathway of the raised inner wall 41 of the next largest insert 23, 24, 25, 26. In this manner, the grooves 39 of the inserts 22, 23, 24, 25 interlock with the raised inner walls 41 of the inserts 23, 24, 25, 26 when the inserts 22, 23, 24, 25, 26 are stacked.

The groove 39 formed into the largest insert 26 engages the peripheral wall 32 that surrounds the primary opening 30 on the primary tray 12. This enables the largest insert 26 to engage the primary tray 12 and provide a solid base for the stacking of the remaining stackable inserts 22, 23, 24, 25.

The inserts 22, 23, 24, 25, 26 are shaped and sized to stack atop one another. Since the inserts 22, 23, 24, 25, 26 progress in size, the inserts 22, 23, 24, 25, 26 form a slight cone as they are stacked. This cone shape helps retain litter 46 by always causing the opening to the below lying toilet to be slightly elevated in the center of the training system 10. This configuration remains true regardless of the number of inserts 22, 23, 24, 25, 26 present.

The present invention training system 10 is used by placing the training system 10 on the toilet 11 or similar structure. Initially, all the stackable inserts 22, 23, 24, 25, 26 and the cap 28 are placed atop the primary tray 12. This fully covers the primary opening 30 in the primary tray 12. Litter 46 is placed in the depression 14 atop the inserts 22, 23, 24, 25, 26 and cap 28. A pet is then trained to use the litter 46 in the depression 14 as a litter box. After a pet gets accustomed to climbing atop a toilet 11 to use the litter 46, the area of litter 46 is reduced. In a first step, the cap 28 is removed. This creates a small opening in the center of the depression 14. The opening is raised, so there is little loss of litter 46 through the opening as the pet disrupts the litter 46. Once the pet becomes accustomed to the presence of the opening, the size of the opening is increased. This is accomplished by removing the smallest insert 22. The process is repeated over time until all of the inserts 22, 23, 24, 25, 26 are removed. Once the largest insert 26 is removed, the primary tray 12 only retains a small amount of litter 46 around its large primary opening 30. Hopefully by this point, the pet has been conditioned to sit upon the toilet 11 and make waste into the toilet 11. Once this conditioning is accomplished, the primary tray 12 is removed and the pet is trained to make waste directly into the toilet 11 without the training system 10.

Each time an insert 22, 23, 24, 25, 26 is removed, there is a chance that the pet being trained will refuse to use the training system 10 as a litter box. At any time, a pet may just consider the opening too large to navigate. This may happen if a pet being trained accidentally steps through or otherwise falls into the existing central opening 34. If this occurs, the only way to get the pet to continue training is to replace one or more of the inserts 22, 23, 24, 25, 26 to reduce or eliminate the central opening 34 until the pet again gains its confidence.

Figure 5:
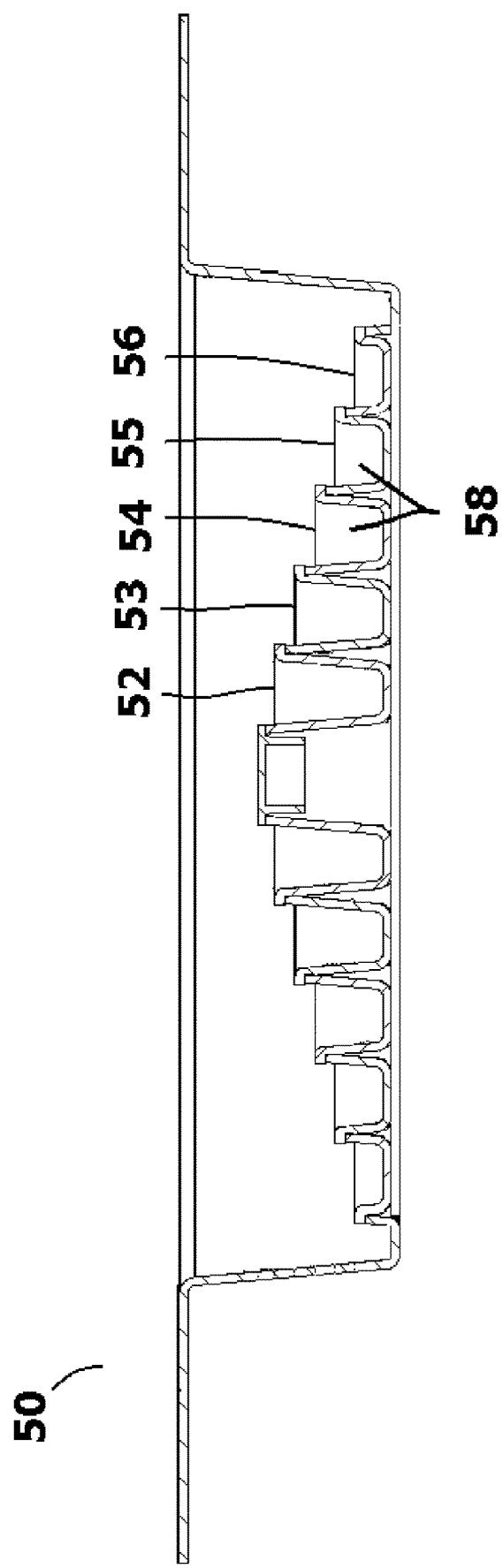
FIG. 5 is an alternate embodiment of a pet training system for a toilet.
Figure 6:
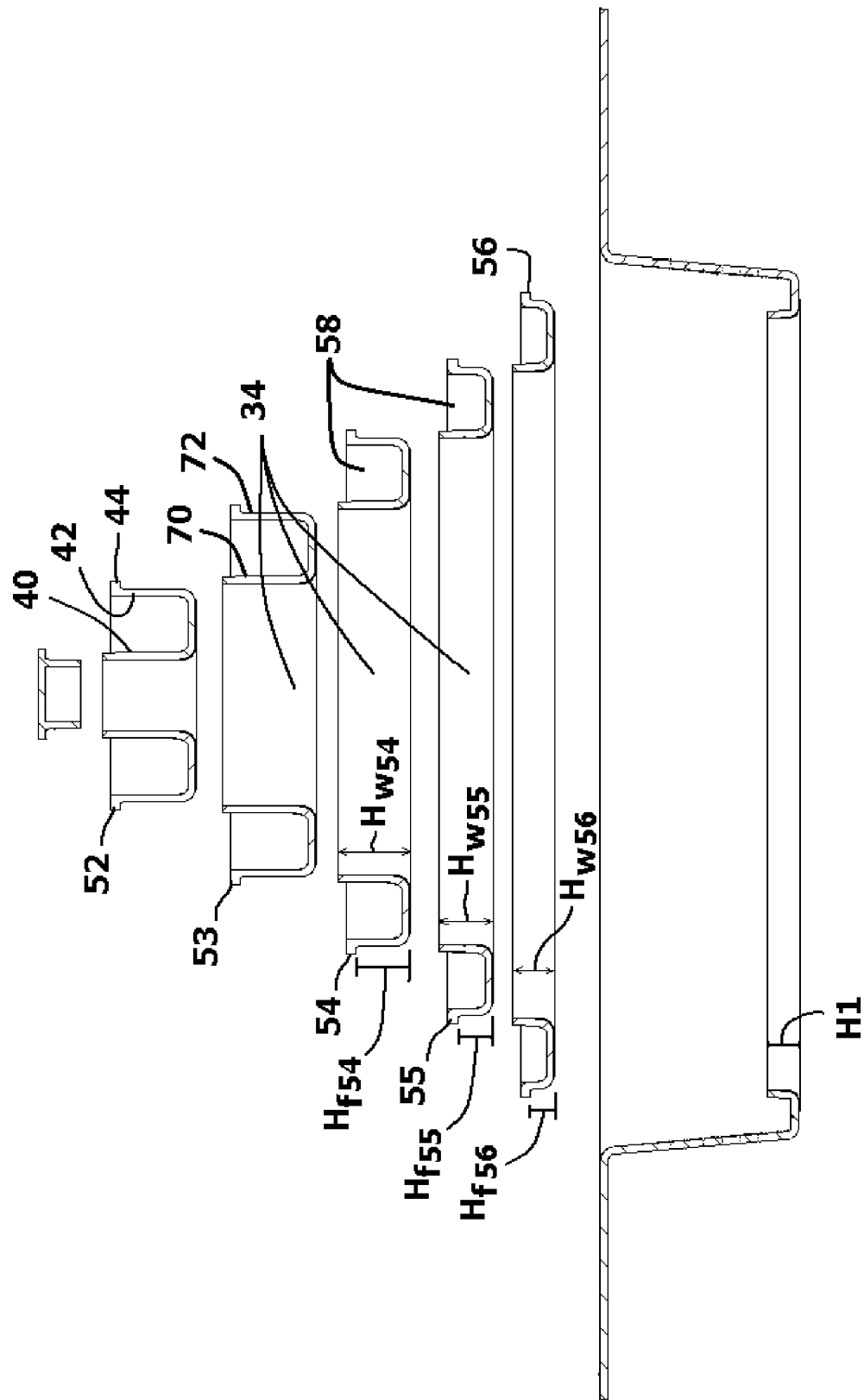
FIG. 6 is a cross-sectional exploded view of the alternate embodiment.

Referring to FIG. 5 and FIG. 6, an alternate embodiment of a training system 50 is shown. In this embodiment, each insert 52, 53, 54, 55, 56 has a generally U-shaped cross-sectional profile that progresses along a closed looped pathway that is either circular or elliptical in shape. Each insert 52, 53, 54, 55, 56 includes a groove 58 that extends between an inner wall 70 and an outer wall 72. The groove 58 can hold a significant volume of litter 46. Each outer wall 72 has a lateral flange 74 that radially extends from the top of the outer wall 72. Accordingly, each outer wall 72 has a flange height ($H_f$), as measured from the bottom of groove 58 to the lateral flange 74.

The inner wall 70 of each insert 52, 53, 54, 55, 56 has a wall height ($H_w$) that is taller than the corresponding flange height ($H_f$) on that same insert 52, 53, 54, 55, 56. That is, the wall height ($H_w$) for the inner wall 70 of each insert 52, 53, 54, 55, 56 is taller than the flange height ($H_f$) of the outer wall 72 on each of the same inserts 52, 53, 54, 55, 56. Furthermore, the wall height ($H_w$) of the inner wall 70 on any insert 52, 53, 54, 55, 56 is equal to the flange height ($H_f$) of the next smallest insert 52, 53, 54, 55. The largest insert 56 has a flange height ($H_{f56}$) and an inner wall height ($H_{w56}$). The flange height ($H_{f56}$) of the largest insert 56 is equal to the height H1 of the raised peripheral rim 62 that surrounds the primary opening 60 on the primary tray. The second largest insert 55 has a flange height ($H_{f55}$) and an inner wall height ($H_{w55}$). The flange height ($H_{f55}$) of the second largest insert 55 is equal to the inner wall height ($H_{w56}$) of the largest insert 56. The third largest insert 54 has a flange height ($H_{f54}$) and an inner wall height ($H_{w54}$). The flange height ($H_{f54}$) of the third largest insert 54 is equal to the inner wall height ($H_{w55}$) of the second largest insert 55. This size progression is continued through all of the inserts 52, 53, 54, 55, 56, regardless of the number of inserts 52, 53, 54, 55, 56 used.

The inserts 52, 53, 54, 55, 56 are shaped and sized to stack atop one another. The lateral flange 74 that extends around each insert 52, 53, 54, 55 rests atop the inner wall 70 of the next largest insert 53, 54, 55, 56, respectively. Since the inserts 52, 53, 54, 55, 56 become taller as they become smaller in area, the inserts 52, 53, 54, 55, 56 form a slight cone as they are stacked. This cone shape helps retain litter 46 by always causing the opening to the below lying toilet to be slightly elevated in the center of the training system. This configuration remains true regardless of the number of inserts 52, 53, 54, 55, 56 present.

It will be understood that the embodiments of the present invention that are illustrated and described are merely exemplary and that a person skilled in the art can make many variations to those embodiments. For instance, the shape of the primary tray and inserts can be altered to match different toilet types. Furthermore, the number and size of inserts can be altered. All such embodiments are intended to be included within the scope of the present invention as defined by the appended claims.

What is claimed is:

1. A method of conditioning a pet to utilize a toilet when making waste, said method comprising the steps of:
   providing a primary tray, wherein said primary tray has a first depression and a primary opening is formed in said depression;
   providing a plurality of stackable inserts that include a largest insert, a smallest insert and intermediate inserts that progress in size between said largest insert and said smallest insert, wherein each of said plurality of stackable inserts defines a central opening of a different size;
   placing said primary tray onto said toilet;
   covering at least some of said primary opening in said primary tray with said plurality of stackable inserts;
   adding litter into said depression of said primary tray to entice said pet to utilize said primary tray as a litter box; and
   removing said plurality of stackable inserts from said depression over a period of time, therein uncovering said primary opening over said period of time.

2. The method according to claim 1, wherein each of said plurality of stackable inserts has a ring with a top surface and a bottom surface.

3. The method according to claim 2, wherein a groove is formed into said bottom surface of each said ring, wherein said groove follows a first looped pathway.

4. The method according to claim 3, wherein a raised wall extends upwardly from said top surface of each said ring, wherein said raised wall follows a second looped pathway.

5. The method according to claim 4, wherein said first looped pathway on said smallest insert and each of said intermediate inserts corresponds to said second looped pathway of another of said plurality of stackable inserts.

6. The method according to claim 5, wherein said second looped pathway on said largest insert and each of said intermediate inserts corresponds to said first looped pathway of another of said plurality of stackable inserts.

7. The method according to claim 1, wherein each of said plurality of stackable inserts vary in height.

8. The method according to claim 7, wherein said plurality of stackable inserts progress in height from a first height at said largest insert to a larger last height at said smallest insert.

9. The method according to claim 1, wherein each of said plurality of stackable inserts has an inner wall that surrounds said central opening, an outer wall, and a bottom surface that extends between said inner wall and said outer wall, wherein said inner wall, said outer wall, and said bottom surface define a groove capable of retaining some of said litter.

10. The method according to claim 9, wherein said inner wall is taller than said outer wall in each of said plurality of stackable inserts.

11. The method according to claim 9, further including a lateral flange that extends from said outer wall of each of said plurality of stackable inserts.

12. The method according to claim 11, wherein covering at least some of said primary opening in said primary tray with said plurality of stackable inserts includes stacking said plurality of stackable inserts by placing said lateral flange of each of said plurality of stackable inserts over said inner wall of a larger one of said plurality of stackable inserts.

13. A method of conditioning a pet to utilize a toilet when making waste, said method comprising the steps of:
   providing a primary tray, wherein said primary tray has a first depression and a primary opening is formed in said depression;
   providing a plurality of inserts, wherein each of said plurality of inserts defines a central opening of a different size;
   placing said primary tray onto said toilet;
   stacking said plurality of inserts over said primary opening in said primary tray;
   adding litter into said depression of said primary tray to entice said pet to make waste in said depression;
   periodically removing one of said plurality of inserts from said depression over a period of time, therein uncovering said primary opening over said period of time.

14. The method according to claim 13, wherein each of said plurality of inserts progresses in size from a largest insert to a smallest insert, wherein said plurality of inserts includes intermediate inserts that progress between said largest insert and said smallest insert.

15. The method according to claim 14, wherein each of said plurality of inserts has a ring with a top surface and a bottom surface.

16. The method according to claim 15, wherein a groove is formed into said bottom surface of each said ring, wherein said groove follows a first looped pathway.

17. The method according to claim 16, wherein a raised wall extends upwardly from said top surface of each said ring, wherein said raised wall follows a second looped pathway.

18. The method according to claim 17, wherein said first looped pathway on said smallest insert and each of said intermediate inserts corresponds to said second looped pathway of another of said plurality of inserts.

19. The method according to claim 17, wherein said second looped pathway on said largest insert and each of said intermediate inserts corresponds to said first looped pathway of another of said plurality of inserts.

20. An assembly for conditioning a pet to utilize a toilet when making waste, said assembly comprising:

a primary tray in which is disposed a depression, wherein a primary opening is formed in said depression;

a plurality of stackable inserts that progress in size between a largest insert and a smallest insert, wherein each of said plurality of stackable inserts defines its own central opening, wherein said plurality of stackable inserts are stacked over said primary opening in said depression, therein covering at least some of said primary opening.

\* \* \* \* \*